Patented Nov. 11, 1924.

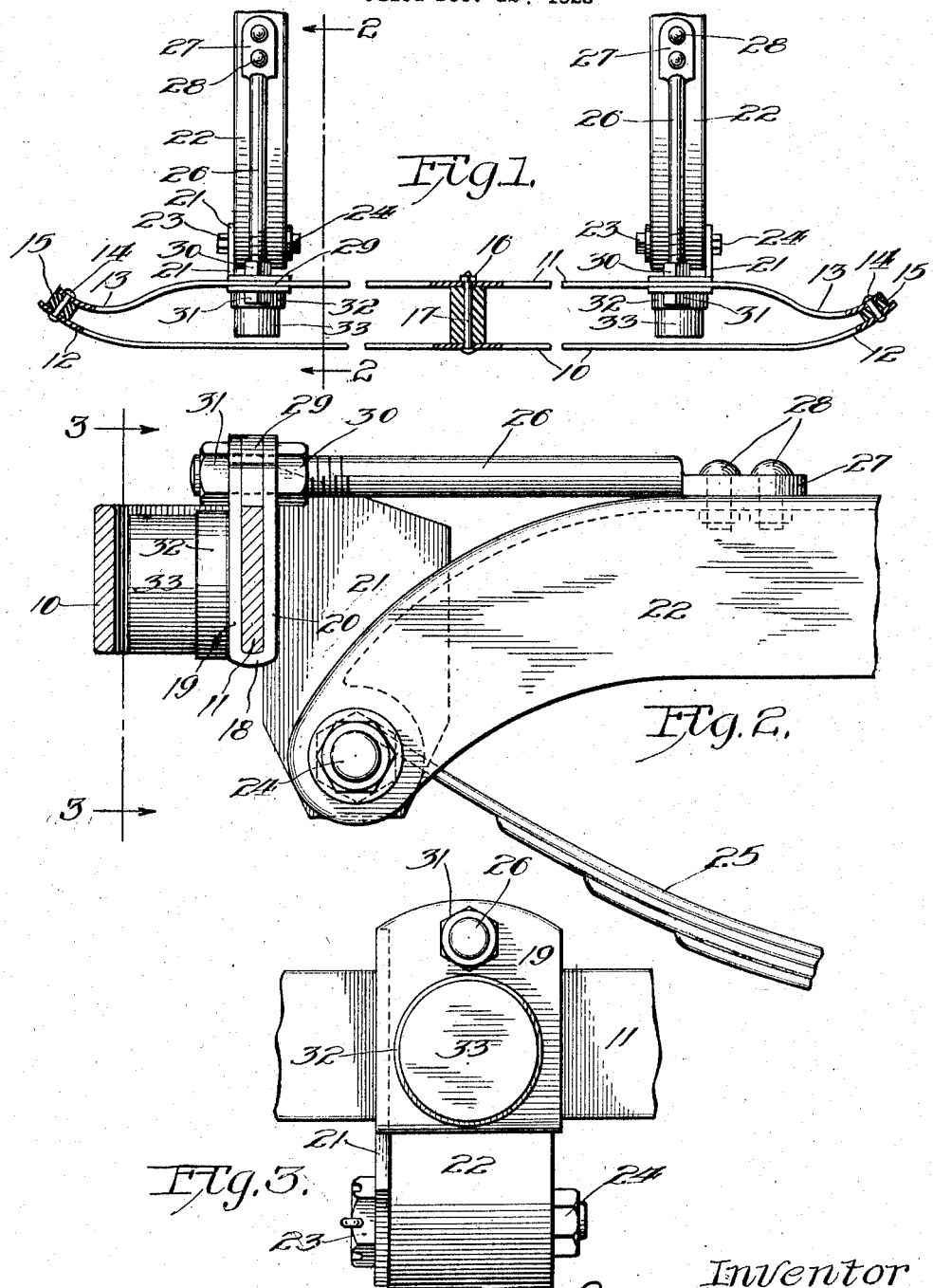

1,515,255

UNITED STATES PATENT OFFICE.

FRANK J. KERBER, OF CHICAGO, ILLINOIS.

BUMPER BAR.

Application filed December 12, 1923. Serial No. 680,085.

*To all whom it may concern:*

Be it known that I, FRANK J. KERBER, a citizen of the Republic of Lithuania, residing at Chicago, in the county of Cook and State of Illinois, have invented certain new and useful Improvements in Bumper Bars, of which the following is a specification.

This invention relates to bumper bars for automobiles, and the invention is directed both to the construction of the bumper bar itself and the means for securing the same to the sills of an automobile in such a manner as to afford a firm and rigid attachment for the bar.

In the drawings:

Figure 1 is a top or plan view showing the bumper bar partially in section and secured to the sills of an automobile;

Fig. 2 is a view taken on line 2—2 of Fig. 1, looking in the direction of the arrows; and Fig. 3 is a view taken on line 3—3 of Fig. 2, looking in the direction of the arrows.

The bumper bar consists of front and rear sections 10 and 11 respectively. The front section has its ends 12 bowed away from the acting face of the bar section, and the rear bar section 11 has its ends 13 configured in the form of an S-shaped curve. Being first bowed forwardly and then rearwardly, the extreme ends of the two bars lie in fairly close proximity to one another and within the planes subtended by the body portions of the front and rear bars. The ends of the bars are connected by means of bolts 14 which are entered through spacer blocks 15 preferably of rubber or other similar cushioning material. The front and rear sections are also connected at their centers by means of a tie bolt 16 entered through a spacer block 17, the spacing of the parts at the center being much greater than at the ends.

The rear bar 11 is carried by a pair of U-shaped brackets 18 each consisting of a front wall 19 and a rear wall 20, the brackets opening upwardly and being of U-shape to permit the rear section of the bumper bar to be dropped into place from above.

The rear wall 20 of the bracket at its outer edge emerges into a rearwardly extending attaching plate 21 which extends at right angles to the body of the bracket and depends therefrom in position to abut against the outer face of the forward end of the car sill 22, in which position it is held in place by means of a nut 23 threaded onto the end of a bolt 24 which is customarily provided to secure the spring 25 to the forward end of the sill.

Each of the brackets is further secured in position by means of a brace bar 26 which is flattened at its rear end 27 to receive bolts 28 which serve to unite it to the top of the car sill 22, and the forward end of the bolt is threaded and entered through the rear and front walls of the bracket and also through a filler block 29 which serves to fill the space above the upper edge of the rear bumper section 11. The bar is adjustably secured to the bracket by means of inner and outer nuts 30 and 31 which may be adjusted to such degree as may be necessary to maintain the bumper bar as a whole in properly adjusted relation to the car sills.

The front wall 19 of each bracket has secured thereto a cup 32 which serves as a socket for a cushion block 33 preferably of rubber and of cylindrical formation, which extends forwardly and terminates slightly out of contact with the front section of the bumper bar, the arrangement being such that if the front section of the bumper bar is flexed inwardly to any material extent it will contact with one or both of the cushion blocks 33 which will thereby assist in absorbing shocks or jars.

The arrangement is one which may be readily fitted to cars of any ordinary construction either in front or in the rear thereof as the case may be, and it will be understood that in the description, the parts have been referred to as those secured to the front of an automobile, but that there is no intention to limit the invention to such position of attachment.

The arrangement is one which when secured will be firmly and rigidly braced in position on the car sills, and at the same time the means provided for making the attachment are such as to afford the necessary attachment to fit the bumper to cars of varying construction.

I claim:

1. In a bumper bar, the combination of inner and outer sections, means for securing the ends of the sections together, U-shaped brackets embracing the inner section, a bolt for each bracket having its rear end adapted for engagement with the top of a car sill, and an attaching plate secured to each bracket and adapted to bear against and be attached to the side of the car sill, substantially as described.

2. In a bumper bar, the combination of inner and outer sections, means for securing the ends of the sections together, U-shaped brackets embracing the inner section, a bolt for each bracket having its rear end adapted for engagement with the top of a car sill, and an attaching plate secured to each bracket and adapted to bear against and be attached to the side of the car sill, a socket carried by each of said brackets, and a cushion block entered in said socket and extending towards the outer bumper bar section, substantially as described.

3. In a bumper bar, the combination of inner and outer sections, means for securing the sections together in spaced relation to one another, a pair of U-shaped brackets embracing the inner bar section, a bolt entered through each of the brackets above the bar section lying therein, each of said bolts extending rearwardly and being provided with means for attachment to the top of a car sill, and means for securing each bracket to the side of the proximate car sill, substantially as described.

4. In a bumper bar, the combination of inner and outer sections, means for securing the sections together in spaced relation to one another, a pair of U-shaped brackets embracing the inner bar section, a bolt entered through each of the brackets above the bar section lying therein, each of said bolts extending rearwardly and being provided with means for attachment to the top of a car sill, each of said brackets being provided with a rearwardly extending plate adapted to bear against the side of the proximate car sill, and means for securing said plate to the car sill, substantially as described.

5. In a bumper bar, the combination of inner and outer sections, means for securing the sections together in spaced relation to one another, a pair of U-shaped brackets embracing the inner bar section, a bolt entered through each of the brackets above the bar section lying therein, each of said bolts extending rearwardly and being provided with means for attachment to the top of a car sill, each of said brackets being provided with a rearwardly extending plate adapted to bear against the side of the proximate car sill, means for securing said plate to the car sill, a socket on each of said brackets, and a cushion block lying within said socket and extending outwardly therefrom towards the outer bumper bar section, substantially as described.

6. In a device of the class described, a bumper bar, U-shaped brackets embracing the bumper bar, a bolt for each bracket having its rear end adapted for engagement with the top of a car sill, and an attachment plate secured to each bracket and adapted to bear against and be attached to the side of the car sill, substantially as described.

7. In a device of the class described, a bumper bar, brackets engaging the bumper bar, a bolt for each bracket having its rear end adapted for engagement with the top of a car sill, and an attachment plate secured to each bracket and adapted to bear against and be attached to the side of the car sill, substantially as described.

FRANK J. KERBER.